(12) United States Patent
Shirai et al.

(10) Patent No.: US 6,324,024 B1
(45) Date of Patent: *Nov. 27, 2001

(54) REFLECTOR FOR DISTANCE MEASUREMENT

(75) Inventors: Masami Shirai, Saitama-ken; Atsumi Kaneko, Tokyo, both of (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,683

(22) Filed: Dec. 4, 1998

(30) Foreign Application Priority Data

Dec. 5, 1997 (JP) .................................................. 9-335950

(51) Int. Cl.⁷ .............................. G02B 5/08; G02B 5/122; G01C 3/08
(52) U.S. Cl. ......................... 359/884; 359/529; 356/4.01
(58) Field of Search ................................. 359/884, 529; 356/4.01, 5.01, 5.02, 5.03, 5.04, 5.05, 5.06, 5.07, 5.08, 5.09, 5.1, 5.11, 5.12, 5.13

(56) References Cited

U.S. PATENT DOCUMENTS

| | | | |
|---|---|---|---|
| 3,704,954 | * 12/1972 | Huther et al. | 356/4.01 |
| 3,758,193 | * 9/1973 | Tung | 359/359 |
| 4,131,791 | * 12/1978 | Lego | 359/529 |
| 4,343,550 | * 8/1982 | Buckley et al. | 356/143 |
| 4,473,277 | * 9/1984 | Brown | 359/601 |
| 4,519,674 | * 5/1985 | Buckley et al. | 359/831 |
| 4,636,068 | 1/1987 | Niiho et al. | 359/823 |
| 5,179,469 | * 1/1993 | Hall et al. | 359/884 |
| 5,216,480 | 6/1993 | Kaneko et al. | 356/139.06 |
| 5,392,521 | * 2/1995 | Allen | 359/529 |
| 5,715,101 | 2/1998 | Nakamura et al. | 356/5.13 |

FOREIGN PATENT DOCUMENTS 0348900  1/1990  (EP) .
7-52626  11/1995  (JP) .

* cited by examiner

Primary Examiner—Audrey Chang
Assistant Examiner—Jennifer Winstedt
(74) Attorney, Agent, or Firm—Greenblum & Bernstein P.L.C (57) ABSTRACT

A reflector is used with an electric distance meter, for measuring a distance of two positions. The reflector includes a reflecting member which reflects an incident light in parallel to the direction of incidence, and a selective transmission member provided to a light-incident surface of the reflecting member. The selective transmission member allows infrared ray to pass, while the selective transmission member prevents visible light from passing.

21 Claims, 10 Drawing Sheets

REFLECTOR FOR DISTANCE MEASUREMENT

BACKGROUND OF THE INVENTION

This invention relates to a distance measuring system using an electric distance meter, and particularly relates to a reflector used therein.

Figure 1:
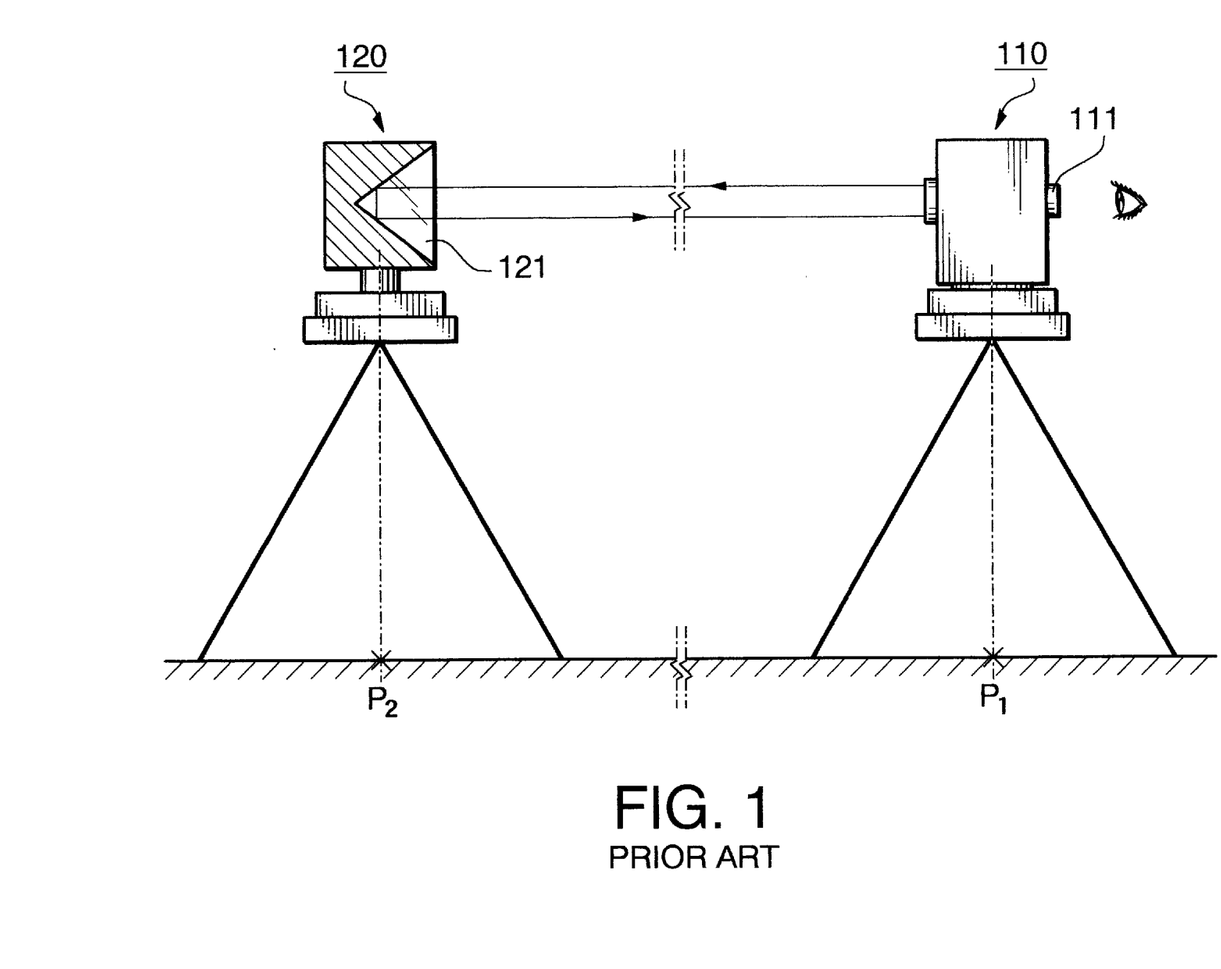
FIG. 1 is a schematic view showing a general arrangement of an electric distance meter and a reflector unit.

An electric distance meter is broadly used to measure a distance between two distal positions. FIG. 1 is a schematic view showing a principle of a distance measuring system using the electric distance meter. In order to detect the distance of two positions P1 and P2, the electric distance meter 110 is located at one position P1. Further, a reflector unit 120, which has a reflector 121 (such as a prism), is located at the other position P2. The electric distance meter 110 emits modulated light (such as infrared rays) to the reflector unit 120. The emitted light is reflected by the reflector 121 and returns to the electric distance meter 110. The electric distance meter 110 detects a phase difference of the emitted light and returned light, to calculate the distance between the positions P1 and P2. Such an electric distance meter can be coupled with a goniometer (such as an electronic theodolite), to constitute a measuring system known as a 'total station'.

Figure 2A:
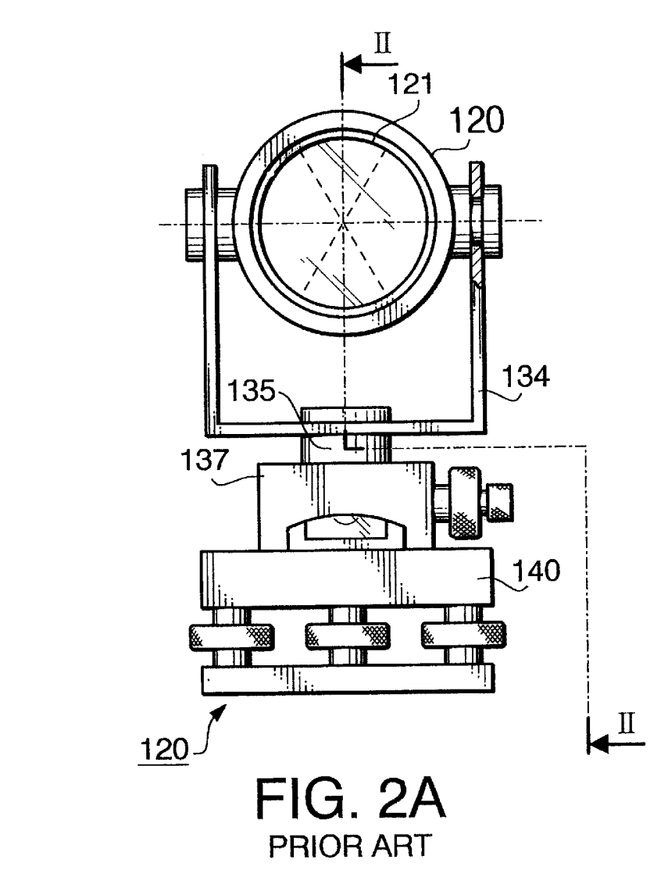
FIGS. 2A and 2B, are a front view and a sectional view of a conventional reflector unit.
Figure 2B:
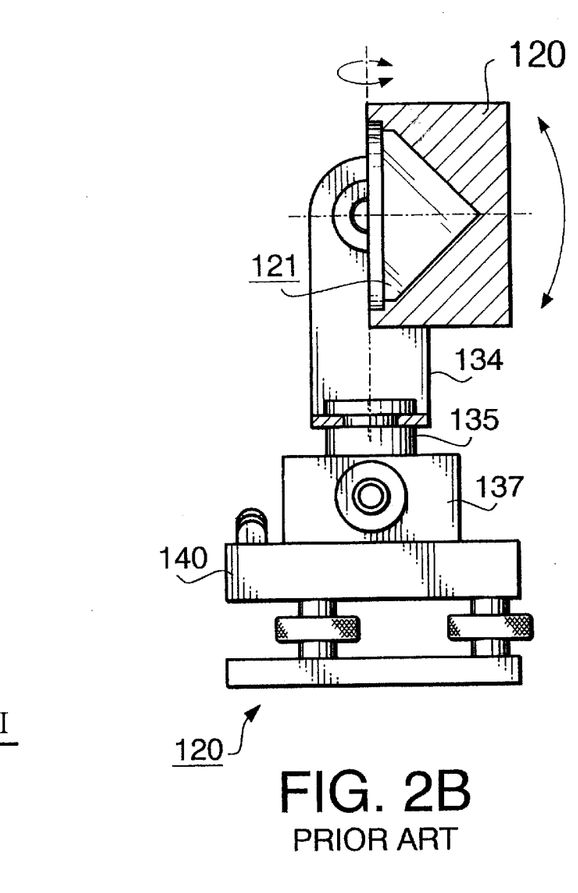

FIG. 2A and 2B are a front view and a sectional view of the conventional reflector unit 120. The reflector unit 120 includes the reflector 121, and a U-shaped support 134 which supports the reflector 121. The reflector 121 is a so-called corner cube which reflects the incident light in parallel to the direction of the incidence. The reflector unit 120 further includes e leveling board 140 mounted on a tripod and a stage 137 adjustably provided on the leveling board 140. The U-shaped support 134 is mounted to the adjustable stage 137 via a shaft 135.

As shown in FIG. 1, the direction of the light emitted from the electric distance meter 110 must be directed to the reflector unit 120. For this purpose, the electric distance meter 110 has a sighting telescope 111 through which an operator can observe the reflector unit 120. With this, the operator is able to correctly direct the electric distance meter 110 toward the reflector unit 120, while observing the reflector unit 120 through the sighting telescope 111.

In order to focus the sighting telescope 111 on the reflector unit 120, the sighting telescope 111 generally includes an autofocus unit of a phase detection focusing type (which is generally used in a single lens reflex camera).

However, when the autofocus unit operates, the sighting telescope 111 may be focused on a virtual image of the electric distance meter 110 reflected by the reflector 121. In such case, the reflector unit 120 is out of focus and can not be seen from the operator. Thus, the operator can not correctly direct the electric distance meter 110 toward the reflector unit 120.

SUMMARY OF THE INVENTION

It is therefore an object of the present invention to provide a reflector which is used with an electric distance meter having an autofocus unit for sighting and which can be correctly focused by the autofocus unit.

For the above purpose, according to an aspect of the present invention, there is provided a reflector including a reflecting member which reflects incident light in parallel to the direction of incidence, and a selective transmission member provided to an incidence side of the reflecting member. The selective transmission member allows light of first wavelength range to pass, while the selective transmission member prevents light of second wavelength range from passing. The reflector is used with a electric distance meter provided with a sighting telescope (having an autofocus unit).

With such an arrangement, if the autofocus unit is arranged to use the light of the second wavelength range, the sighting telescope is not focused on a virtual image of the electric distance meter (reflected by the reflecting member), since the light of the second wavelength range does not reach the reflecting member of the reflector. That is, the sighting telescope is focused on the reflector. Accordingly, the operator is able to direct of the sighting telescope toward the reflector, observing the sighting telescope. Further, the electric distance meter is possible to perform the distance measurement by using the light of the first wavelength range, since the light of the first wavelength range is reflected by the reflecting member and returns to the electric distance meter. Preferably, the light of the first wavelength range is infrared rays, while the light of the second wavelength range is visible light.

Optionally, the selective transmission member is provided with a indication mark (such as a cross line) on an incident surface. With such an arrangement, an operator is able to adjust the direction of the electric distance meter, observing the indication mark on the selective transmission member through the sighting telescope.

Advantageously, the selective transmission member is detachably attached to the reflecting member. With this, the selective transmission member can be mounted to a conventional reflector. Alternatively, the selective transmission member is directly attached to the surface of the reflecting member. With this, a fixing member (for fixing the selective transmission member to the reflecting member) is not needed.

In a preferred embodiment, the reflecting member includes a corner cube having three perpendicular surfaces. The corner cube has an advantage such that the corner cube reflects the incident light in parallel to the direction of the incidence.

According to another aspect of the present invention, there is provided a reflector having a selective reflection surface (which reflects the light of the first wavelength range, while allowing the light of the second wavelength to pass), and an absorbing surface which absorbs light which passes the selective reflection surface.

With such an arrangement, if the autofocus unit is arranged to use the light of the second wavelength range, the sighting telescope is not focused on a virtual image of the electric distance meter, since the light of the second wavelength range passes through the selective reflection surface and absorbed by the absorbing surface. That is, the sighting telescope is focused on the reflector. Further, the electric distance meter is able to perform the distance measurement by using the light of the first wavelength range, since the light of the first wavelength range is reflected by the selective reflection surface and returns to the electric distance meter.

According to still another aspect of the present invention, there is provided a reflector including a reflecting member which reflects an incident light in parallel to the direction of incidence, and an indication mark which is provided on a surface of the reflecting member, the incident light being incident of the surface.

If the distance to be measured is sufficiently short, the sighting telescope is not focused on a virtual image of the electric distance meter (even though the visible light is reflected by the reflection member). Thus, the autofocus unit is able to focus the sighting telescope on the indication mark (such as a cross line) on the glass disk. Since the cross line can be clearly observed through a sighting telescope, the operator is able to adjust the direction of the electric distance meter toward the reflector.

DESCRIPTION OF THE PREFERRED EMBODIMENT

General Arrangement

A distance measuring system to which reflectors of the first to third embodiments are employed is described.

Figure 3:
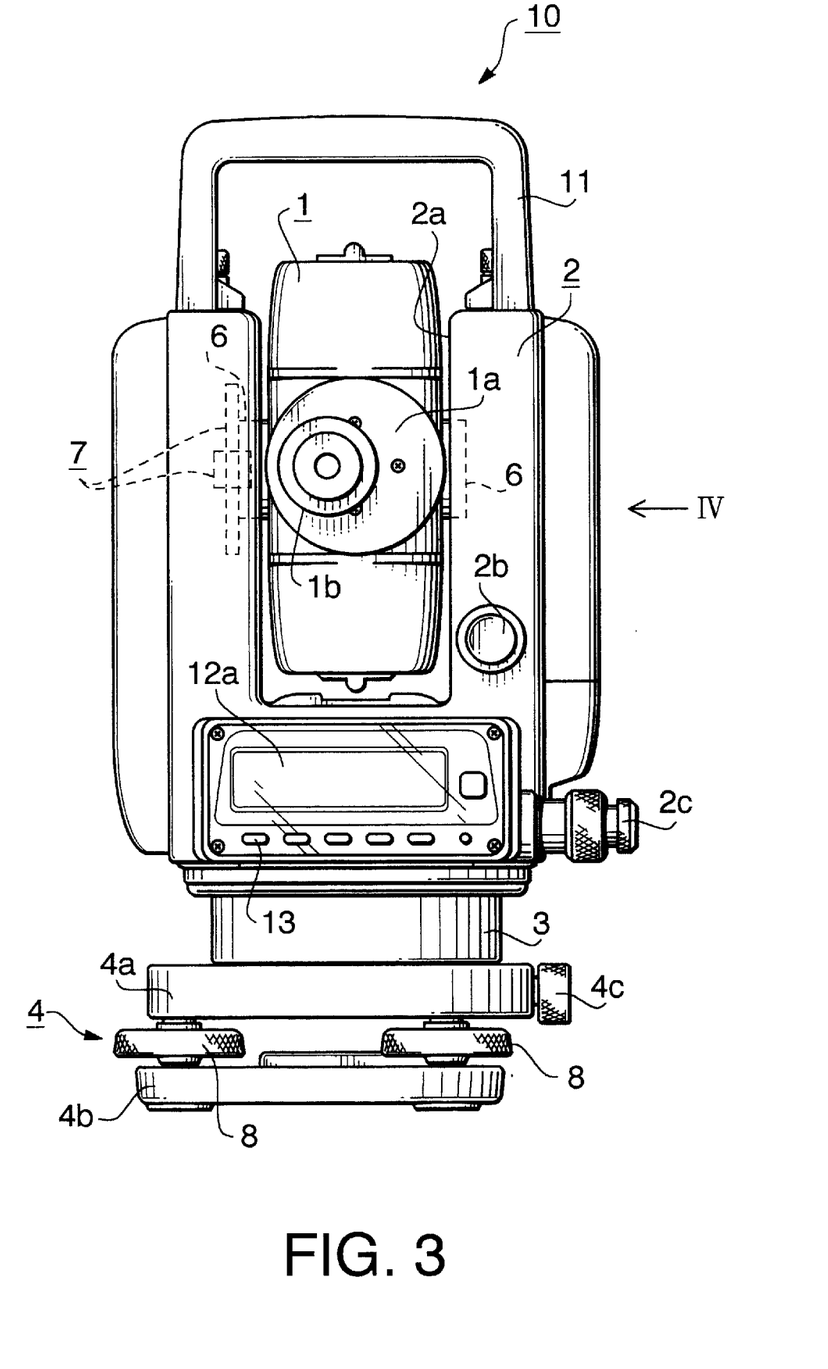
FIG. 3 is a front view of an electric distance meter.
Figure 4:
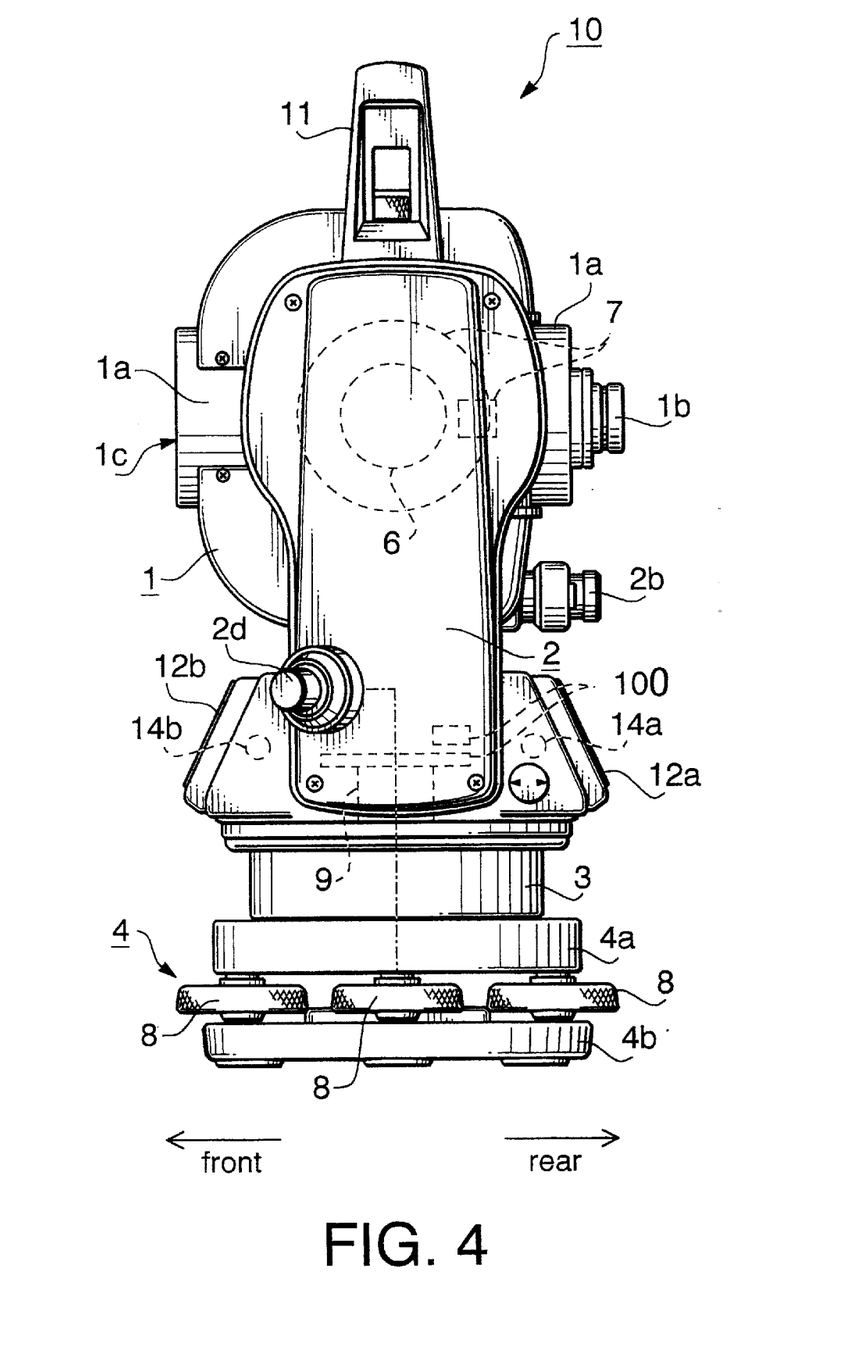
FIG. 4 is a sectional view of the electric distance meter of FIG. 3.

FIG. 3 is a front view of an electric distance meter 10. FIG. 4 is a side view of the electric distance meter 10, seen from the direction IV of FIG. 3. The electric distance meter 10 includes a leveling board 4 mounted on a not-shown tripod, a stage 3 mounted on the leveling board 4, and a support 2 provided on the stage 3. The support 2 has a U-shaped portion 2a in which a movable part 1 is rotatably supported.

A sighting telescope 1a is mounted to the movable part 1, through which an operator observes a reflector (detailed below). The sighting telescope 1a includes an eyepiece portion 1b and an objective system 1c at both ends thereof. The sighting telescope 1a also has an optical system for distance measurement. That is, the sighting telescope 1a is able to emit the modulated light and to receive the returned light.

The movable part 1 is supported by a rotatable shaft 6 which horizontally bridges the U-shaped portion 2a of the support 2. That is, the movable part 1 is vertically rotatable (about the rotatable shaft 6). In order to detect the vertical rotation angle of the movable part 1, an encoder 7 of an incremental type is provided to the end of the rotatable shaft 6. As shown in FIG. 4, the support 2 is fixed to the stage 3 by means of a vertical shaft 9. The vertical shaft 9 is provided to the bottom of the support 2, so that the support 2 is horizontally rotatable (with respect to the stage 3). In order to detect the horizontal rotation angle of the support 2, an encoder 100 of an incremental type is provided to the top end of the vertical shaft 9.

A first adjusting screw 2b is provided to the rear side (that is, the right side in FIG. 4) of the support 2, for finely adjusting the vertical rotational position of movable part 1 with respect to the support 2. A second adjusting screw 2c is provided to the bottom of the support 2, for finely adjusting the horizontal rotational position of the support 2 with respect to the stage 3.

A control circuit is provided in the support 2, which controls the operation of the electric distance meter 10. Two liquid crystal display (LCD) panels 12a and 12b are provided at rear and front sides of the support 2. The LCD panels 12a and 12b are respectively illuminated by backlights 14a and 14b provided in the support 2. Beneath the LCD panels 12a and 12b, an operation portion 13 (FIG. 3) is provided, for inputting various kind of data and operation commands into the control circuit.

A handle 11 (which is to be held by an operator) is provided to the top of the support 2, in such a manner that the handle 11 bridges the U-shaped portion 2a of the support 2. The handle 11 can be removed from the support 2, so that the handle 11 does not interfere with the light path of the sighting scope 1a.

The leveling board 4 includes upper and lower plate 4a and 4b. In order to make the leveling board 4 horizontal, three leveling screws 8 are provided between the upper and lower plates 4a and 4b. By adjusting the projecting amount of the leveling screws 8, the inclination of the upper plate 4a (with respect to the lower plate 4b) can be adjusted.

As constructed above, the movable part 1 is able to be orientated in any direction with respect to the stage 3. Further, the orientation of the movable part 1 is detected by means of the encoders 7 and 10.

Further, the stage 3 is provided on the leveling board 4 so that the stage 3 is horizontally slidable on the top surface of the leveling board 4. The stage 3 is fixed to the upper plate 4a by a fixing screw 4c provided to the upper plate 4a. In order to locate the vertical shaft 9 on a position to be measured, a centering telescope 2d is provided to the support 2. An eyepiece portion of the centering telescope 2d is projected from the side of the support 2 and an objective system (not shown) thereof is faced downward. The optical axis of the objective system (shown by double dashed line in FIG. 4) is vertically extended, being aligned with the center axis of the vertical shaft 9. An operator is able to adjust the position of the stage 3 on a position to be measured, observing the centering telescope 2d.

Figure 5:
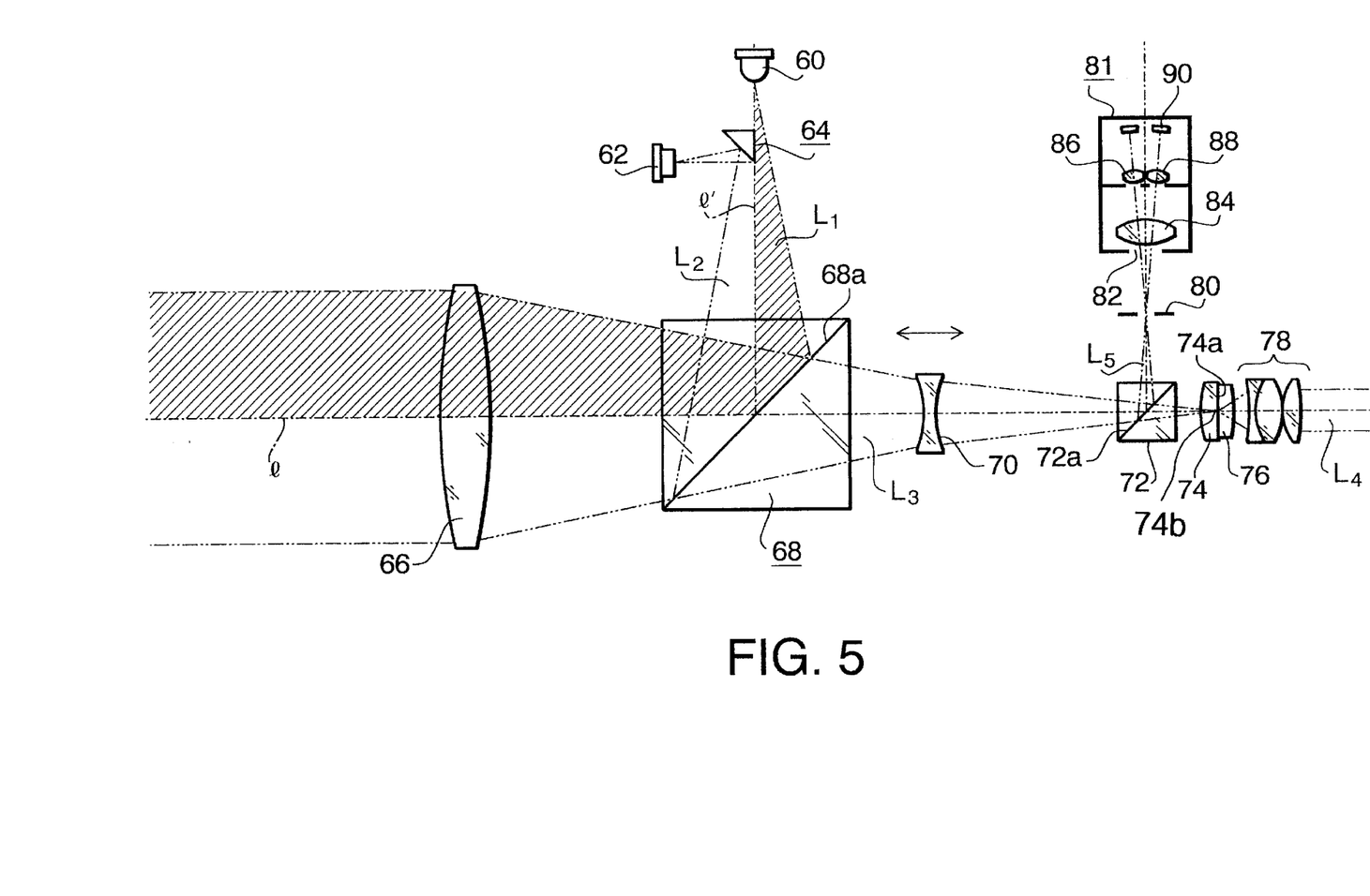
FIG. 5 is a schematic view showing an optical system of the electric distance meter of FIG. 3.

An optical system of the sighting telescope 1a is described with reference to FIG. 5. The sighting telescope 1a includes an object lens 66. Further, a dichroic prism 68, a focus lens 70, a beam splitter 72, a focusing screen 74, a cover glass 76 and an eyepiece lens 78 are arranged on a optical axis of the object lens 66. The dichroic prism 68 has a separation surface 68a which is inclined by 45 degrees with respect to the optical axis of the object lens 66. The separation surface 68a reflects infrared rays (by 100%), while the separation surface 68a allows the visible light to pass (by 100%).

At a focus position of the object lens 66 along the optical axis bent by the separation surface 68a, a light emitting diode (LED) 60 is positioned. The LED 60 emits the modulated light L1, that is, infrared rays having a wavelength range of 750 to 900 nm. A prism 64 is placed in a light path between the LED 60 and the dichroic prism 68. The prism 64 interferes with the infrared rays emitted from LED 60. Also, the prism 64 reflects the light L2 from the dichroic prism 68 (by 90 degrees) toward a light receiving element 62.

With such an arrangement, the modulated light L1 (emitted from LED 60) is partially shaded by the prism 64, and the remaining light is incident on the dichroic prism 68 and is reflected (at the separation surface 68a) toward the objective lens 66. The reflected modulated light L1 passes through the object lens 66 and proceeds to the reflector unit (FIGS. 6A and 6B) in the form of the parallel light. The returning light L2 passed through the object lens 66 and reflected (at the separation surface 68a of the dichroic prism 68) toward the prism 64. The returned light L2 is reflected by the prism 64 and is incident on the light receiving element 62. The controller measures the phase difference between the emitted light L1 and the returned light L2, thereby to determine the distance between two positions based on the phase difference. The principle of this distance measurement is conventionally known. As one example of such a distance measurement, applicants refer to European Patent Publication No. 0348900B1, the disclosure of which is expressly incorporated by reference herein.

The focus lens 70 is a negative lens, and is moved by a not-shown driving mechanism along the optical axis of the object lens 66. The focus lens 70 and the object lens 66 constitute an objective system that converges the visible light L3 (that has passed through the reflection surface 68a) to form an image at a surface (a focal plane 74a) of the focusing screen 74. The beam splitter 72 includes a separation surface 72a inclined by 45 degrees with respect to the incident light, which reflects a part of incident light and allows the remaining light to pass through.

The visible light L4 that has passed through the beam splitter 72 further passes through the focusing screen 74 and incident on an eyepiece lens 78. An operator is able to observe the image formed on the focal plane 74a of the surface of the focusing screen 74. A indication mark (detailed below) is provided on the focal plane 74a of the focusing screen 74, which is covered by the cover glass 76. With this, the operator is able to observe the indication mark and the image overlapped with each other.

The visible light L5 reflected by the beam splitter 72 passes through a focus-equivalent plane 80 that is equivalent to the focal plane 74a, passes through an aperture mask 82, and enters into an autofocus sensor unit 81. The autofocus sensor unit 81 detects an amount and a direction of the focusing lens 70 to be moved (for forming the image on the equivalent focus plane 80) by means of phase difference detection method. That is, the visible light L5 passes through a condenser lens 84, an aperture mask 86 and a separator lens 88, so that the visible light L5 is divided into two light fluxes respectively form images on two areas of a CCD 90. The two images on the CCD 90 are transferred to image data which are inputted to a not-shown controller. The controller calculates the amount and the direction of the focusing lens 70 to be moved, based on the difference of the image date of CCD 90. Further, the focusing lens 70 is moved according to the calculation, so that image is formed on the focal plane 74a.

First Embodiment

Figure 6A:
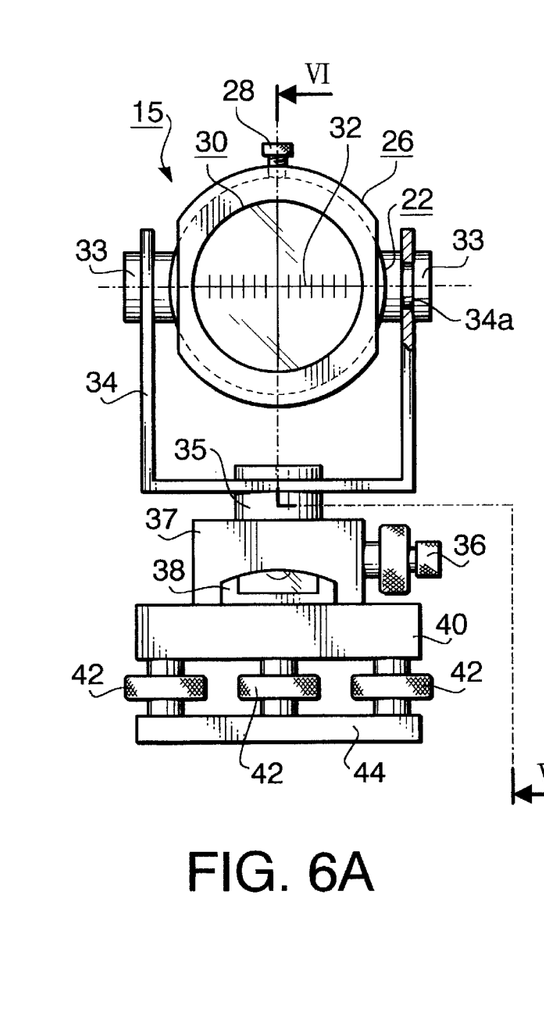
FIGS. 6A and 6B are a front view and a sectional view of a reflector unit according to a first embodiment.
Figure 6B:
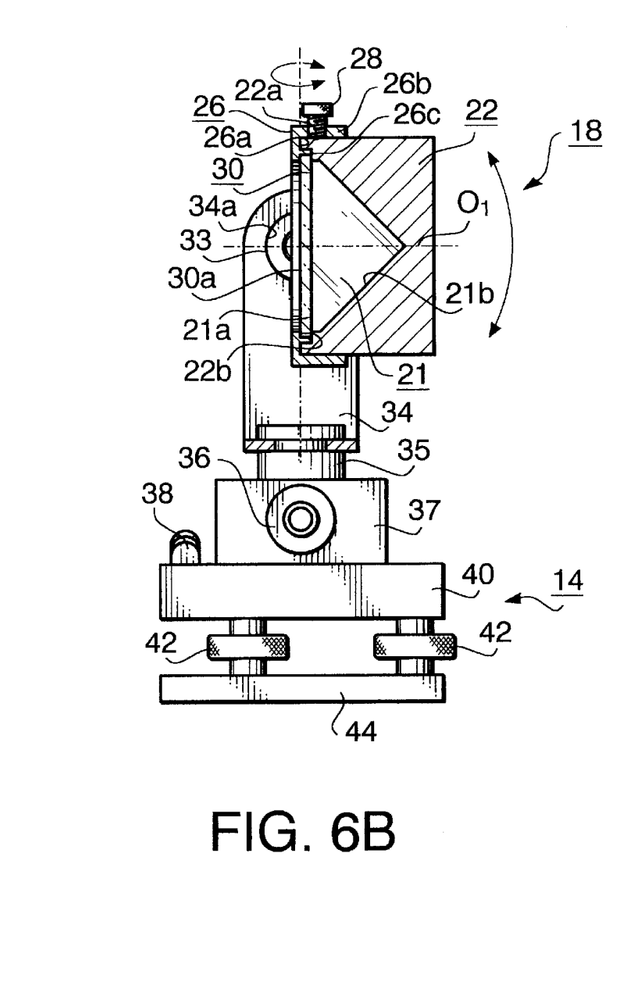

The first embodiment of the present invention is described. FIG. 6A is a front view of the reflector unit 15 according to the first embodiment. FIG. 6B is a sectional view of the reflector unit 15 taken along Line VI—VI of FIG. 6A.

The reflector unit 15 includes the reflector 18, a U-shaped support 34 which supports a reflector 18, a stage 37 on which the U-shaped support 34 is mounted, and a leveling board 14 mounted on a not shown tripod. The reflector 18 includes a corner cube 21, a prism holder 22 to which the corner cube 21 is mounted, and a filter 30 mounted to a light-incident surface of the corner cube 21. A fixing ring 26 is used to fix the filter 30 to the surface of the corner cube 21.

Figure 7:
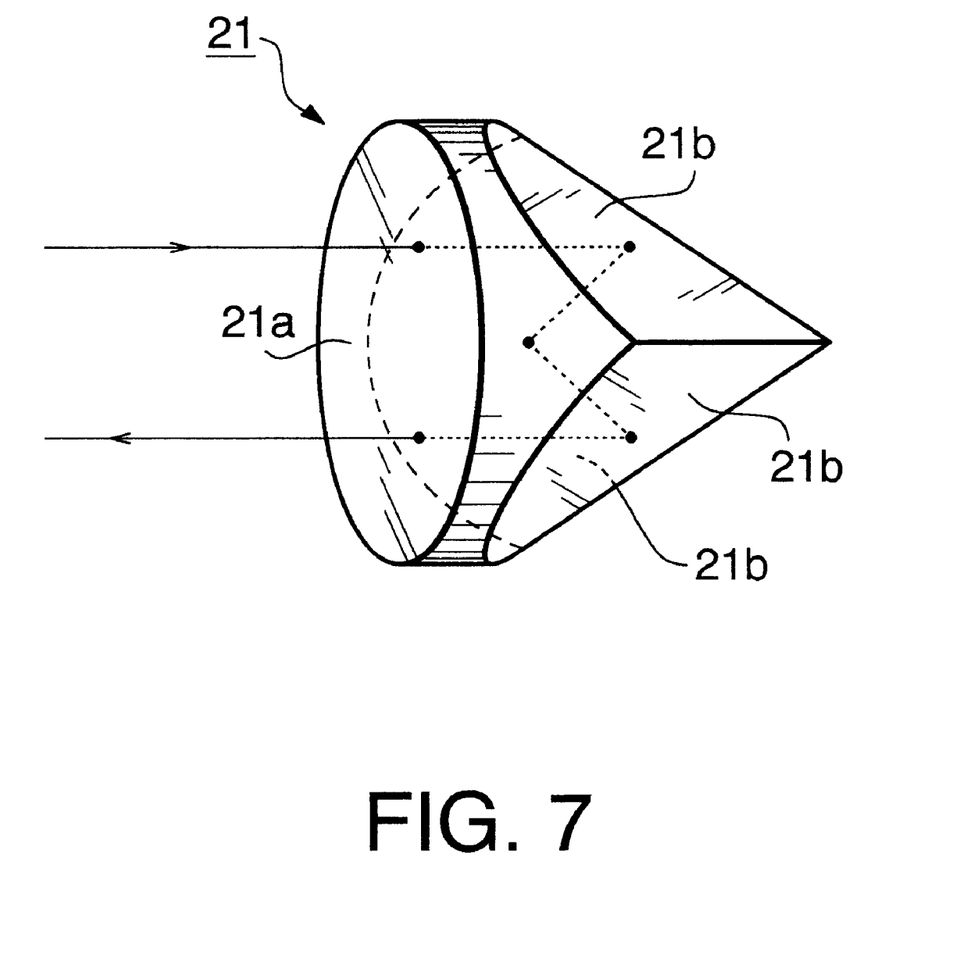
FIG. 7 is perspective view of a corner cube.

The shape of the corner cube 21 is shown in FIG. 7. The corner cube 21 has a tetrahedron shape that is cut out from a corner of a cubic. That is, the corner cube 21 includes three perpendicular surfaces (used as three refection surfaces 21b) and one inclined surface (used as a light-incident surface 21a). With this, the light incident on the light-incident surface 21a is reflected by three surfaces 21b and emitted from the light-incident surface 21a as shown in FIG. 7. That is, the corner cube 1 reflects the incident light in parallel to direction of incidence. The corner cube 21 is cut by a peripheral plane of a cylindrical body so that the light-incident surface 21a is round-shaped.

As shown in FIGS. 6A and 6B, the prism holder 22 is an opaque member, and has a recess for mounting the corner cube 21 therein. The corner cube 21 is fitted in the recess so that the light-incident surface 21a is exposed to the exterior. The center axis of the prism holder 22 is aligned with the center line of the corner cube 21.

The filter 30 is made of a material which allows infrared rays to pass and which absorbs visible light. The filter 30 has a disk shape with a certain thickness. A shoulder portion 22a, 22b is formed on the prism holder 22 so that the shoulder portion 22a, 22b surrounds the light-incident surface 21a of the corner cube 21 (mounted to the prism holder 22). The depth of the shoulder portion 22b is substantially the same as the thickness of the filter 30. When the filter 30 is mounted to the shoulder portion 22b, the filter 30 and the light-incident surface 21a of the corner cube 21 mate with each other. A cross line 32 with scales is painted on an outer surface 30a of the filter 30 by means of white paint material. The center position of the cross line 32 is aligned with the center line $O_1$ of the corner cube 21 (passing through the apex thereof).

The fixing ring 26 is provided for fixing the filter 30 to the prism holder 22. The fixing ring 26 includes unitarily formed two rings: a peripheral ring 26b which fits on the outer periphery of the prism holder 22, and a front ring 26a which abuts the end surface of the prism holder 22. The peripheral ring 26b is fixed to the prism holder 22 by a screw 28 at the top of the prism holder 22. The front ring 26a has a ring-shaped projection 26c in which the filter 30 is held. The depth of the ring-shaped projection 26c is substantially the same as the thickness of the filter 30.

With such an arrangement, when the fixing ring 26 is fixed to the outer periphery of prism holder 22 (by means of the screw 28), the ring-shaped projection 26c fits to the shoulder portion 22b of the prism holder 22, so that the filter 30 contacts the light-incident surface 21a of the corner cube 21. Further, the filter 30 can be detached by loosening the screw 28 and detaching the fixing ring 26 from the prism holder 22. The fixing ring 26 is painted by a color which has a clear contrast with respect to the filter 30, so that the filter 30 and the fixing ring 26 can be easily detected by the sighting telescope 1a.

As shown in FIG. 6A, the prism holder 22 has two support shafts 33 horizontally extended from both sides thereof. The support shafts 33 are supported in support holes 34a formed on the U-shaped support 34. Thus, the prism holder 22 is supported by the U-shaped support 34 so that the inclination of the prism holder 22 is vertically adjustable. The fixing ring 26 has two straight notches at both side ends, so that the peripheral ring 26b and the front ring 26a do not interfere with the support shafts 33. Further, a vertical shaft 35 is provided on the bottom center of the U-shaped support 34 and is fixed to the stage 37. With this, the U-shaped support 34 is horizontally rotatable. The support shafts 33 and the vertical shaft 35 are perpendicular to each other, so that the prism holder 22 is able to direct in any direction.

The leveling board 14 includes a bottom plate 44 and a top plate 40. Three leveling screws 42 are provided between the top and bottom plates 40 and 44. By adjusting the projecting amounts of the leveling screws 42, the inclination of the top plate 40 with respect of the bottom plate 44 is adjusted. With this, the direction of the vertical shaft 35 can be adjusted to the vertical direction by the leveling screws 42. A level gauge (bubble tube) 38 is placed on the upper plate 40 of the leveling board 14. The level gauge 38 is used to measure the leveling of the upper plate 40 during the adjustment.

In order to correctly locate the reflector unit 15 at a position to be measured, a centering telescope 36 is provided to the stage 37. An eyepiece portion of the centering telescope 36 is projected from the side of the stage 37. A not-shown objective system of the centering telescope 36 faced downward, so that the optical axis (shown by two-dotted line) of the objective system is aligned with the center line of the vertical shaft 35. An operator is able to adjust the position of the stage 37 on a position to be measured.

Figure 8:
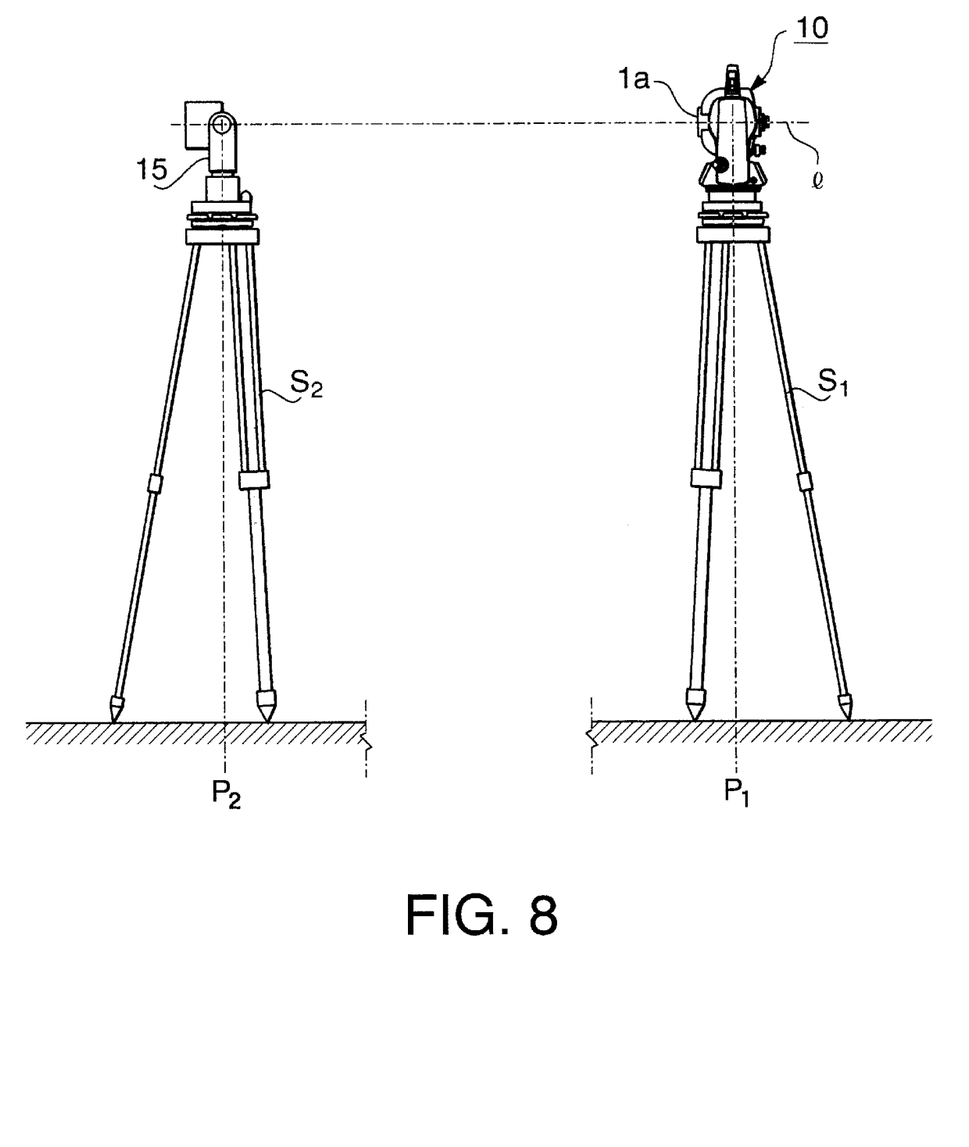
FIG. 8 is a schematic view showing an arrangement of an electric distance meter and a reflector unit.

The operation of the measurement is described. As shown in FIG. 8, the electric distance meter 10 and the reflector unit 15 are respectively mounted on tripods S1 and S2. Next, an operator locates the electric distance meter 10 and the reflector unit 15 at positions P1 and P2 to be measured. The operator adjusts the leveling of the electric distance meter 10 and the reflector unit 15, operating the above described leveling screws 8 and 42. Further, the operator adjusts the positions of the electric distance meter 10 and the reflector unit 15 precisely on the positions P1 and P2, using the above described centering telescopes 2c and 36.

Then, the operator vertically and horizontally rotates the reflector 18 so that the light-incident surface 21a of the corner cube 21 is directed toward the electric distance meter 10. Further, the operator directs the sighting telescope 1a toward the reflector unit 15, and turns on the autofocus sensor unit 81 (FIG. 5). With this, the focus lens 70 (FIG. 5) is moved so that an image is formed on a focal plane 74a (FIG. 5). Observing the image seen through the sighting telescope 1a, the operator adjusts the direction of the sighting telescope 1a so that the reflector unit 15 enters into the view field the sighting telescope 1a. Then, the operator precisely adjusts the direction of the sighting telescope 1a so that the cross line 32 of the filter 30 (FIG. 6A) is overlapped with the cross line 74b formed on the focal plane 74a (FIG. 5) of the sighting telescope 1a.

In this state, since the visible light incident on the reflector 15 is shielded by the filter 30, the visible light does not reach the reflection surface of the corner cube 21. That is, the corner cube 21 is not observable from the autofocus sensor unit 81. Thus, there is no possibility that the sighting telescope is focused on a virtual image of the electric distance meter 10 (reflected by the corner cube 21). Conversely, the cross line 32 on the filter 30 (or, the outer periphery of the filter 30) is observable from the autofocus sensor unit 81. Thus, the sighting telescope is focused on the cross line 32 on the filter 30 (or, the outer periphery of the filter 30). Accordingly, the operator is able to adjust the direction of the sighting telescope 1a so that the cross line 32 on the filter 30 is aligned with the cross line formed on the focal plane 74a. With this, the optical axis of the object lens 66 of the sighting telescope 1a is aligned with the corner cube 21, so that the light emitted from the sighting telescope 1a enters the corner cube 21.

Then, the operator starts the measurement of the distance. The modulated light emitted by the sighting telescope 1a proceeds to the reflector unit 15, where the light passes through the filter 30 and the corner cube 21. After reflected thrice in the corner cube 21, the light emitted from the corner cube 21, passes the filter 30, and returns to the sighting telescope 10. By detecting the phase difference between the emitted light and the returning light, the distance between positions P1 and P2 are calculated based on the phase difference. In this calculation, the prism constant is corrected so as to compensate for the thickness of the filter 30.

As constructed above, according to the first embodiment, by providing the filter 30 to the light-incident surface 21a of the corner cube 21, there is no possibility that the sighting telescope 10 is focused on a virtual image of the electric distance meter 10 (reflected by the corner cube 21). Thus, the operator is able to adjust the direction of the electric distance meter 10 so that the cross line 32 painted on the filter 30 (FIG. 6A) is aligned with the cross line formed on the focal plane 74a (FIG. 5) of the sighting telescope 1a. Accordingly, it is possible to precisely adjust the direction of the electric distance meter 10 toward the reflector 15. In addition, since the filter 30 is detachable, the filter 30 can be mounted to the conventional reflector.

Second Embodiment

Figure 9A:
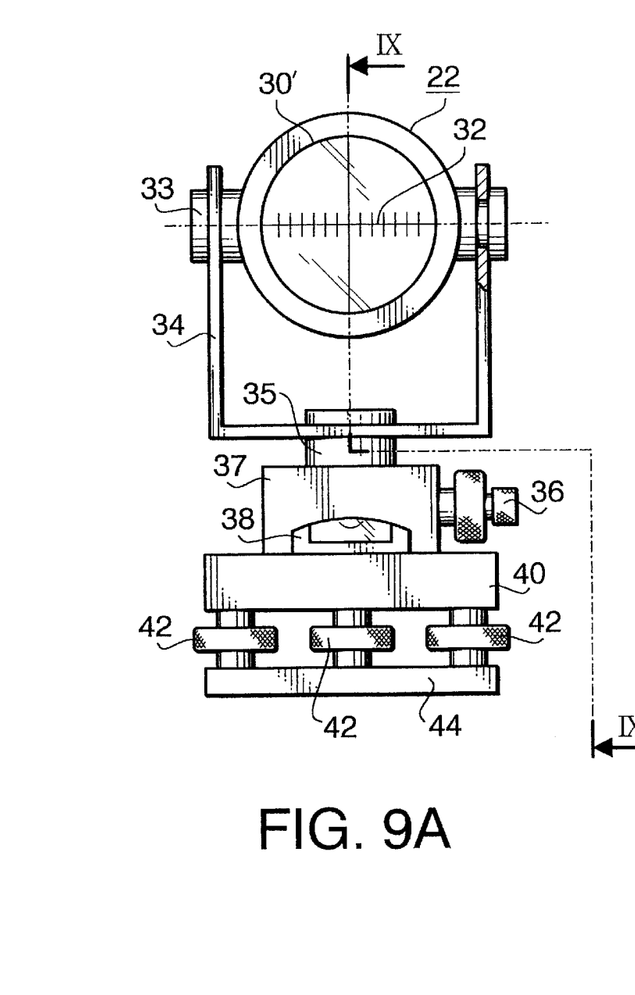
FIGS. 9A and 9B are a front view and a sectional view of a reflector unit according to a second embodiment.
Figure 9B:
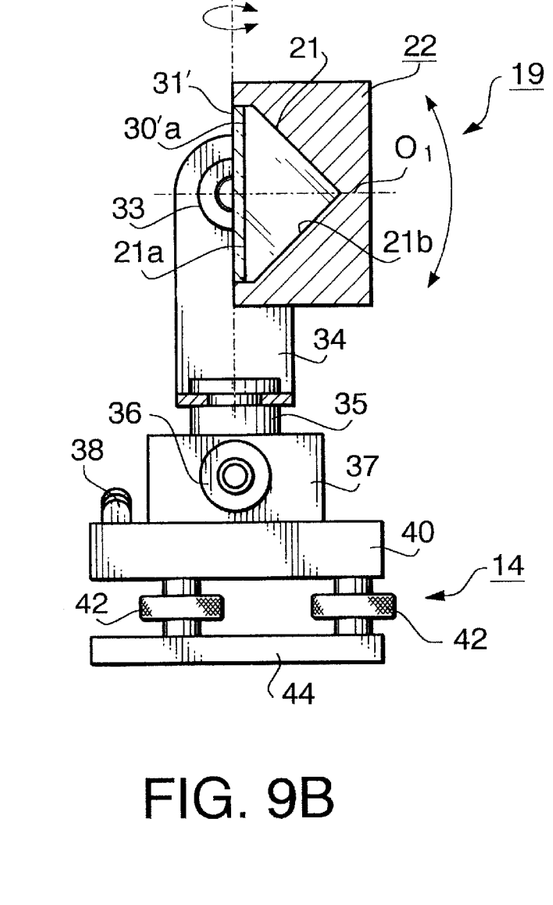

The second embodiment is described with reference to FIGS. 9A and 9B. Elements in this embodiment that are identical to elements in the first embodiment are assigned the same reference numerals and the description thereof is omitted. FIG. 9A is a front view of the reflector unit 19 according to the second embodiment. FIG. 9E is a sectional view of the reflector unit taken along Line IX—IX of FIG. 9A.

As in the first embodiment, the corner cube 21 is mounted in the recess of the prism holder 22 so that the light-incident surface faced outward. A filter 30' of the second embodiment is disk-shaped. The shape of the surface of the filter 30' is the same as the light-incident surface 21a of the corner cube 21. Further, the filter 30' is mounted to the recess of the prism holder 22, in such a manner that the inner surface of the filter 30' is attached to the light-incident surface 21a of the corner cube 21. In particular, the filter 30' is directly formed on the light-incident surface 21a of the corner cube 21. Alternatively, the filter 30' can be integrally fixed to the light-incident surface 21a of the corner cube 21. The filter 30' is made of a material which allows the infrared rays to pass and which absorbs visible light. Further, a cross line 32 is painted on the surface 30'a of the filter 30' with a white paint material.

As in the first embodiment, according to the second embodiment, there is no possibility that the sighting telescope 1a (FIG. 4) is focused on a virtual image of the electric distance meter 10 (reflected by the corner cube 21). Thus, it is possible to precisely adjust the direction of the electric distance meter 10 toward the reflector. Further, since the filter 30 is mounted to the prism holder 22 with no special fixing member, the parts number is reduced.

The alternative arrangement of the filter 30 (30') of the first and second embodiments is described. This arrangement is limited to the use of the short distance measurement. In this arrangement, a glass disk is used instead of the filter 30 (30') of the first and second embodiments. The glass disk has a cross line painted on an outer surface thereof. The glass disk is mounted to the prism holder 22 in a similar manner (FIG. 6B) to the first embodiment.

If the distance to be measured is short, a sighting telescope 1a (FIG. 4) may not be focused on a virtual image of the electric distance meter 10 (even though the visible light is reflected by the corner cube 21). Thus, the autofocus unit 81 (FIG. 5) of the sighting telescope 1a is able to focus on the cross line on the glass disk. Since the cross line can be clearly observed through sighting telescope, the operator is able to adjust the direction of the electric distance meter until the cross line on the glass plate is aligned with the cross line formed on the focal plane 14a (FIG. 5).

The Third Embodiment

Figure 10A:
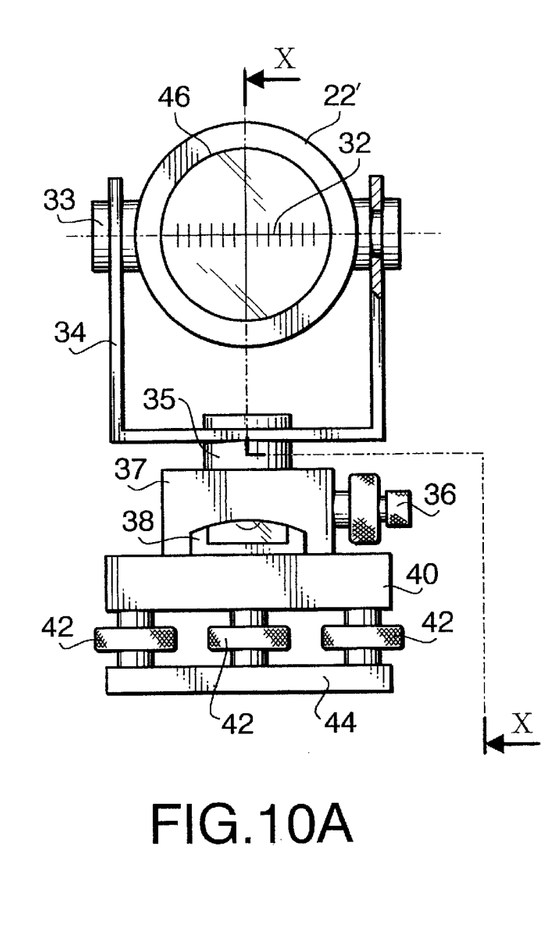
FIGS. 10A and 10B are a front view and a sectional view of a reflector unit according to a third embodiment.
Figure 10B:
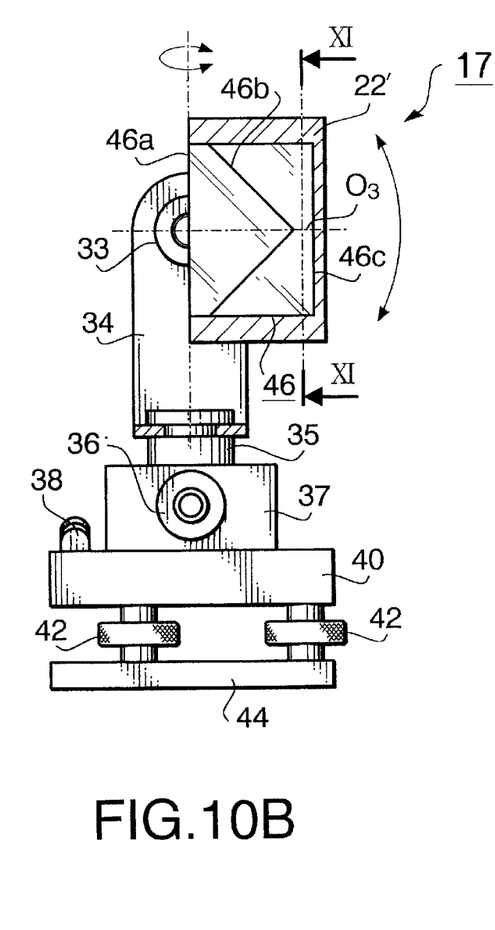
Figure 10C:
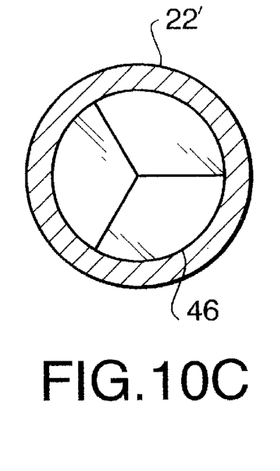
FIG. 10C is a sectional view of the reflector unit, showing an indication mark.

The third embodiment is described with reference to FIGS. 10A and 10B. Elements in this embodiment that are identical to elements in the previous embodiments are assigned the same reference numerals and the description thereof is omitted. FIG. 10A is a front view of the reflector unit according to the third embodiment. FIG. 10B is a sectional view of the reflector unit taken along Line X—X of FIG. 10A. FIG. 10C is a sectional view of the prism holder 22' and the beam splitter 46, taken along Line XI—XI of FIG. 10B.

The third embodiment uses a cylindrical beam splitter 46. The cylindrical beam splitter 46 has three selective reflection surface 46b which are perpendicular with each other. The reflection surface 46b cross at an apex which is positioned on a center line $O_3$ of the cylindrical beam splitter 46. One end surface of the beam splitter 46 is exposed to the exterior, which is used as an light-incident surface 46a. Another end surface 46c of the beam splitter 46 (opposing to the light-incident surface 46a) is painted black, so as not to reflect light.

The selective reflection surface 46b reflects infrared rays (by 100%) and allows visible light to pass (by 100%). The infrared rays (entering through the light-incident surface 46a) are reflected by three selective reflection surfaces 46b and emitted from the light-incident surface 46a. The visible light passes through the selective reflection surface 46b and proceeds toward the non-reflection surface 46c.

A cross line 32 with scales are painted on an outer surface of the beam splitter 46 with a white paint material. A prism holder 22' of the third embodiment has a cylindrical recess in which the beam splitter 46 is mounted. The prism holder 22' is painted a color in a sharp contrast to the light-incident surface 46a.

In the third embodiment, the measuring process is the same as that of the previous embodiments. An operator directs the sighting telescope toward a reflector unit 15, and turns on the autofocus sensor unit 81 (FIG. 5). With this, the focus lens 7 (FIG. 5) is moved, so that the sighting telescope 1a (FIG. 4) is focused on the cross line 32 on the light-incident surface 46a is focused.

The visible light passes the selective reflection surface 46b and proceeds to the non-reflection surface 46c and is absorbed by the non-reflection surface 46c. Since the visible light is not reflected, there is no possibility that the sighting telescope 1a is focused on a virtual image of the electric distance meter 10. Conversely, the cross line 32 on the light-incident surface 46a of the beam splitter 46 is observable from the autofocus sensor unit 81. Thus, the sighting telescope is focused on the cross line 32 on the light-incident surface 46a. Since the operator is able to clearly observe the cross line on the light-incident surface 46a of the beam splitter 46, it is possible to precisely adjust the direction of the sighting telescope so that the cross line 32 of the beam splitter 46 is aligned with the cross line of the focal plane (FIG. 5).

After the electric distance meter 10 is correctly directed toward the reflector unit 17, a measurement is started. The modulated light (infrared rays) emitted from the electric distance meter 10 enters the beam splitter 46 (through the light-incident surface 46a). The modulated light is reflected thrice by the selective reflection surfaces 46b, is emitted from the light-incident surface 46a, and returns to the electric distance meter 10. The distance of positions P1 and P2 is calculated based on a phase difference between the emitted light and the returning light.

As in the previous embodiment, according to the third embodiment, there is no possibility that the sighting telescope 1a (FIG. 4) is focused on a virtual image of the electric distance meter 10. Thus, it is possible to precisely adjust the direction of the electric distance meter 10 toward the reflector.

In third embodiment, the non-reflection surface 46c reflects no light as described above. However, practically, it is possible that the non-reflection surface 46c reflects a small amount of visible light. Further, it is also possible to provide a cross line on the non-reflection surface 46c of the beam splitter 46 (instead of the light-incident surface 46a of the beam splitter 46), using a white paint material.

Modifications

Based on the above described embodiments, many modifications can be made. For example, the cross line 32 painted on the surface of the light-incident surface of the filter 30, 30' (or, the beam splitter 46) can be replaced with a figure, mark, line or any other pattern which indicates the position of the center of light-incident surface.

Further, it is also possible not to provide a cross line on light-incident surface of the filter 30, 30' (or, the beam splitter 46). Even in such case, the autofocus unit 81 (FIG. 5) is able to focus on the fixing ring 26 or prism holder 22, 22', which has a color of a sharp contrast to the filter 30, 30' (or, the beam splitter 46). Thus, the operator is able to adjust the center (although not marked) on the filter 30, 30' (or, the beam splitter 46) approximately to the cross line of the focal plane 74a (FIG. 5).

Although infrared rays are employed for distance measurement in the first through third embodiment, infrared rays can be replaced with any light other than visible light.

Although the reflector is described herein with respect to the preferred embodiments, many modifications and changes can be made without departing from the spirit and scope of the invention.

The present disclosure relates to subject matters contained in Japanese Patent Application No. HEI 9-335950, filed on Dec. 5, 1997, which is expressly incorporated herein by reference in its entirety.

What is claimed is:

1. An electric distance metering system including a reflector, said system comprising:

an electric distance meter, including a distance measuring system with a first light source emitting a light beam of a first wavelength range;

a sighting telescope having an auto-focusing system, said auto-focusing system receiving light of a second wavelength range;

a reflecting member which reflects back an incident light beam parallel to the direction of incidence;

a selective transmission member provided to a light-incident surface of said reflecting member, said selective transmission member passing the light beam of the first wavelength range, while preventing the light of the second wavelength range from passing, said reflecting member and said selective transmission member preventing auto-focusing error by preventing a reflection in said second wavelength range of at least said electric distance meter from returning to said auto-focusing system, while permitting distance measurement by permitting a reflection in said first wavelength range of said light beam of said first wavelength range to return to said distance measuring system; and a focusable portion having a color of sharp contrast with respect to said reflector and a fixing member which affixes said selective transmission member with respect to said reflecting member, said sharp contrast being a sufficient amount of contrast such that said auto-focusing system focuses on said sharp contrast, said fixing member having said color in said second wavelength range of said sharp contrast with respect to said reflecting member.

2. The electric distance metering system according to claim 1, wherein said first wavelength range is included within an infrared wavelength range, while said light of said second wavelength range is included within a visible light range.

3. The electric distance metering system according to claim 1, wherein said selective transmission member is provided with an indication mark on a light-incident surface thereof.

4. The electric distance metering system according to claim 3, wherein said indication mark comprises a cross line.

5. The electric distance metering system according to claim 1, wherein said selective transmission member is detachably attached to said reflecting member.

6. The electric distance metering system according to claim 1, wherein said selective transmission member is directly fixed to said reflecting member.

7. The electric distance metering system according to claim 1, wherein said reflecting member comprises a corner cube having three perpendicular surfaces.

8. The electric distance measuring system according to claim 1, wherein said sighting telescope comprises a first cross line formed on a focal plane thereof; and said light-incident surface of said reflecting member comprises an indication mark having a second cross line, said distance measuring system being aligned with said reflecting member when said first cross line overlaps said second cross line.

9. The electric distance metering system according to claim 1, wherein said focusable portion is one of a fixing member, an indication mark, a fixing ring, or a prism holder.

10. An electric distance metering system including a reflector, said system comprising:

an electric distance meter, including a distance measuring system with a first light source emitting a light beam of a first wavelength range;

a sighting telescope having an auto-focusing system and a first cross line formed on a focal plane thereof, said auto-focusing system receiving light of a second wavelength range;

said reflector including a selective reflection surface which reflects the light of said first wavelength range, while passing light of said second wavelength range;

said reflector including an absorbing surface which absorbs said second wavelength range light which passes said selective reflection surface, said reflector and said absorbing surface preventing auto-focusing error by preventing a reflection in said second wavelength range of at least said electric distance meter from returning to said auto-focusing system, while permitting distance measurement by permitting a reflection in said first wavelength range of said light beam of said first wavelength range to return to said distance measuring system;

a focusable portion having a color of sharp contrast with respect to said reflector, said sharp contrast being a sufficient amount of contrast such that said auto-focusing system focuses on said sharp contrast; and said reflector including a light-incident surface that comprises an indication mark having a second cross line, said distance measuring system being aligned with said reflecting member when said first cross line overlaps said second cross line.

11. The electric distance metering system according to claim 10, wherein said first wavelength range is included within an infrared wavelength range, while said light of said second wavelength range is included within a visible light range.

12. The electric distance metering system according to claim 10, wherein said selective reflection surface is provided with an indication mark.

13. The electric distance metering system according to claim 12, wherein said indication mark comprises a cross line.

14. The electric distance metering system according to claim 10, wherein said absorbing surface is provided with an indication mark formed thereon.

15. The electric distance metering system according to claim 10, wherein said selective reflection surface has three rectangular surfaces.

16. The electric distance metering system according to claim 10, wherein said absorbing surface is made of black paint material.

17. The electric distance metering system according to claim 10, further comprising:

a prism on which said selective reflection surface is formed; and a mount member on which said reflector is mounted, said mount member having said color of said sharp contrast in said second wavelength range with respect to said reflector.

18. The electric distance metering system according to claim 10, wherein said focusable portion is one of a fixing member, an indication mark, a fixing ring, or a prism holder.

19. An electric distance metering system including a reflector, said system comprising:

an electric distance meter, including a distance measuring system;

a sighting telescope having a first cross line formed on a focal plane thereof;

a reflecting member which reflects back incident light parallel to the direction of incidence; and an indication mark having a second cross line formed on a light-incident surface of said reflecting member, said distance measuring system being aligned with said reflecting member when said first cross line overlaps said second cross line.

20. A reflector for use with an electric distance metering system emitting a light beam of a first predetermined wavelength range in a first direction and receiving light of a second predetermined wavelength range along a second direction parallel to said first direction, said reflector comprising:

a reflecting member which reflects back the light beam in said second direction;

a selective transmission member provided to a light-incident surface of said reflecting member, said selective transmission member having an indication mark formed on the light-incident surface thereof, said selective transmission member and said indication mark passing the light beam of the predetermined first wavelength range to reflect and return to the electric distance metering system along the second direction, said selective transmission member preventing image-forming light of the second predetermined wavelength range from returning to the electric distance metering system along the second direction; and said indication mark reflecting light of the second predetermined wavelength to the electric distance metering system along the second direction.

21. The reflector according to claim 20, wherein said first predetermined wavelength range is within an infrared emission range;

said second predetermined wavelength range is within a visible light emission range, said selective transmission member passing the light beam of the infrared emission range, while preventing the light of the visible light emission range from passing.

* * * * *